United States Patent
Ohya et al.

(10) Patent No.: US 7,470,312 B2
(45) Date of Patent: Dec. 30, 2008

(54) EXHAUST EMISSION CONTROL DEVICE

(75) Inventors: Toshiki Ohya, Hino (JP); Hiroshi Endou, Iruma (JP)

(73) Assignee: Hino Motors, Ltd., Hino-shi (JP)

( * ) Notice: Subject to any disclaimer, the term of this patent is extended or adjusted under 35 U.S.C. 154(b) by 220 days.

(21) Appl. No.: 10/580,227

(22) PCT Filed: Jul. 12, 2004

(86) PCT No.: PCT/JP2004/009937

§ 371 (c)(1),
(2), (4) Date: May 22, 2006

(87) PCT Pub. No.: WO2005/052328

PCT Pub. Date: Jun. 9, 2005

(65) Prior Publication Data

US 2007/0144126 A1 Jun. 28, 2007

(30) Foreign Application Priority Data

Nov. 27, 2003 (JP) ............................. 2003-397266

(51) Int. Cl.
*B01D 46/00* (2006.01)
*F01N 3/021* (2006.01)

(52) U.S. Cl. .................. 96/386; 55/385.3; 55/DIG. 30; 60/311

(58) Field of Classification Search .................. 96/380, 96/384, 385, 386, 387, 388; 55/385.3, DIG. 21, 55/DIG. 30; 60/311, 322, 324, 297
See application file for complete search history.

(56) References Cited

U.S. PATENT DOCUMENTS

| 4,032,310 | A | * | 6/1977 | Ignoffo | ........................ 422/170 |
| 4,851,015 | A | * | 7/1989 | Wagner et al. | .................. 95/15 |
| 4,867,768 | A | * | 9/1989 | Wagner et al. | ................ 96/386 |
| 4,896,503 | A | * | 1/1990 | Furlan | ........................ 60/311 |
| 4,899,540 | A | * | 2/1990 | Wagner et al. | ................ 60/274 |
| 5,009,065 | A | * | 4/1991 | Howe et al. | ................... 60/288 |
| 5,048,287 | A | * | 9/1991 | Howe et al. | ................... 60/288 |
| 5,792,247 | A | * | 8/1998 | Gillingham et al. | ........... 96/386 |

FOREIGN PATENT DOCUMENTS

| JP | 2003-097248 | 4/2003 |
| JP | 2003-172119 | 6/2003 |
| JP | 2003-172121 | 6/2003 |

* cited by examiner

*Primary Examiner*—Frank M Lawrence
*Assistant Examiner*—Robert A Clemente
(74) *Attorney, Agent, or Firm*—Oblon, Spivak, McClelland, Maier & Neustadt, P.C.

(57) ABSTRACT

An arrangement is provided for an exhaust emission control device having a filter cartridge fitted through insertion into an inner shell of a muffler. The inner shell is formed to have an inner diameter greater than an outer diameter of a cartridge shell to provide an insertion clearance. The inner shell is formed with an inward, tapered portion gradually reduced in diameter toward a direction of insertion of the filter cartridge, with a portion of the inner shell inward of the tapered portion formed as a small-diameter portion having a reduced insertion clearance. Sealing and cushioning materials are fitted over the outer peripheral surface on an inward end of the cartridge shell and are adapted to be held in a clamped manner between the filter cartridge and the small-diameter portion of the inner shell upon fitting of the filter cartridge.

7 Claims, 3 Drawing Sheets

EXHAUST EMISSION CONTROL DEVICE

TECHNICAL FIELD

The present invention relates to an exhaust emission control device.

BACKGROUND ART

Particulates or particulate matter from a diesel engine is mainly constituted by carbonic soot and a soluble organic fraction (SOF) of high-boiling hydrocarbon and contains a trace of sulfate (misty sulfuric acid fraction). In order to suppress such kind of particulates from being discharged into atmosphere, it has been carried out that a particulate filter is incorporated in an exhaust pipe through which exhaust gas flows.

The particulate filter is a porous honeycomb structure made of ceramics such as cordierite and having lattice-like compartmentalized passages. Alternate ones of the passages have plugged inlets and the remaining passages with unplugged open inlets are plugged at their outlets. Thus, only the exhaust gas passing through the thin porous compartment walls is discharged downstream and the particulates are captured on inner surfaces of the walls.

Especially in a case of a vehicle such as tractor with short wheel bases and having various accessories laid out in mutually close relationship, it is hard to secure a new mounting space for such kind of particulate filter so as not to interfere with the accessories. As a result, it has been under review to store the particulate filter in a muffler and efficiently arrange the both of them in one and the same mounting space.

In the particulate filter, unburned ash deriving from lubricant and not removable by combustion is gradually accumulated and it is accordingly necessary to take out the particulate filter for direct cleaning such as air cleaning or water washing or to replace the same with a new filter. Thus, the particulate filter must be removably attached to the muffler.

For example, in the following Reference 1 by the same applicant as that of the invention, an exhaust emission control device has been proposed in which a box-shaped muffler has therein an inner shell arranged fixedly, a particulate filter being integrally carried by a cartridge shell and unitized into a filter cartridge which is fitted through insertion into the inner shell.

[Reference 1] JP 2003-97248A

SUMMARY OF THE INVENTION

Problems to be Solved by the Invention

However, when the filter cartridge is to be fitted through insertion into the inner shell in the muffler in one direction, the greater an insertion clearance between the inner shell and the filter cartridge is, the easier the insertion of the cartridge into the inner shell becomes; this, however, provides warring problems that the exhaust gas tends to bypass the particulate filter and the filter cartridge tends to backlash.

In order to prevent the exhaust gas from bypassing the particulate filter and the filter cartridge from backlashing, sealing and cushioning materials have to be interposed in a gap between the inner shell and the filter cartridge. It is, however, very difficult to interpose the sealing and cushioning materials through compression of the same to predetermined compression amounts. Moreover, it is hard to obtain sealing and cartridge-holding performances required since the filter cartridge is arranged eccentrically of the inner shell and thus surface pressures on the sealing and cushioning materials vary peripherally.

The invention was made in view of the above and has its object to provide an exhaust emission control device which improves easiness in insertion of a filter cartridge into an inner shell while reliably preventing exhaust gas from bypassing a particulate filter and the filter cartridge from backlashing.

Means or Measure for Solving the Problems

The invention is directed to an exhaust emission control device wherein an inner shell is arranged fixedly in a muffler incorporated in an exhaust pipe, a particulate filter being integrally carried by a cartridge shell and unitized into a filter cartridge which is fitted through insertion into said inner shell, characterized in that the inner shell is formed to have an inner diameter greater than an outer diameter of the cartridge shell to provide an insertion clearance, said inner shell being formed with a tapered portion at a position short of an inward end thereof by a predetermined distance, said tapered portion being gradually reduced in diameter in a direction of insertion of the filter cartridge, a portion of the inner shell inward of said tapered portion being formed as a small-diameter portion with the reduced insertion clearance, sealing and cushioning materials being fitted over an outer peripheral surface on the inward end of the cartridge shell and adapted to be held in a clamped manner between the filter cartridge and the small-diameter portion of said inner shell upon fitting of the filter cartridge.

Thus, in this manner, the filter cartridge can be easily inserted, utilizing the insertion clearance secured between the inner diameter of the inner shell and the outer diameter of the cartridge shell. Moreover, when the filter cartridge is deeply inserted into the inner shell, the sealing and cushioning materials on the inward end of the cartridge shell are guided by the inward, tapered portion of the inner shell, whereby the filter cartridge is centered and finally coaxially stored in the inner shell.

In this case, the sealing and cushioning materials on the inward end of the cartridge shell are smoothly compressed into the insertion clearance reduced and defined by the inner diameter of the small-diameter portion while receiving the wedge effect by the tapered portion of the inner shell, whereby predetermined compression amounts are reliably obtained with respect to the sealing and cushioning materials. Moreover, concurrently, surface pressures on the sealing and cushioning materials are peripherally equalized because of the filter cartridge being centered, whereby sealing performance by the sealing material and the cartridge-holding performance by the cushioning material are substantially improved in comparison with those obtained conventionally.

Further, it is preferable in the invention that a first stopper is provided on an outer peripheral surface of the cartridge shell at a position short of the inward end thereof by a predetermined distance, a second stopper being provided in the inner shell so as to hold together with the first stopper the sealing and cushioning materials in a clamped manner upon fitting of the filter cartridge.

Thus, upon fitting of the filter cartridge, the sealing and cushioning materials are also held in the clamped manner between the first and second stoppers so as to be further reliably compressed, thereby attaining further improvement in the sealing performance by the sealing material and in the cartridge-holding performance by the cushioning material.

When the invention is to be carried out more concretely, for example, mat material made of heat-resistant fabric may be fitted as sealing material over an outer peripheral surface on an inward end of a cartridge shell and net material made of metal wire may be fitted as cushioning material peripherally over the cartridge shell at positions outward and inward of the sealing material, the cushioning material fitted inward being extruded inward out of the cartridge shell by a predetermined distance, the second stopper being in the form of tapered ring gradually reduced in diameter toward the cartridge shell and having a maximum diameter slightly larger than the outer diameter of the cartridge shell.

Effects of the Invention

According to the above-mentioned exhaust emission control device of the invention, the insertion clearance is secured between the inner diameter of the inner shell and the outer diameter of the cartridge shell for easy insertion of the filter cartridge, so that work or operation burden upon insertion of the filter cartridge is remarkably relieved and thus, while improving the easiness in insertion of the filter cartridge, the sealing and cushioning materials are reliably compressed to predetermined compression amounts. Moreover, the surface pressures on the sealing and cushioning materials are peripherally equalized, so that the sealing performance by the sealing material and the cartridge-holding performance by the cushioning material are substantially improved in comparison with those obtained conventionally, resulting in advantages of preventing the exhaust gas from bypassing the particulate filter and excellently holding the filter cartridge without backlash.

Figure 1:
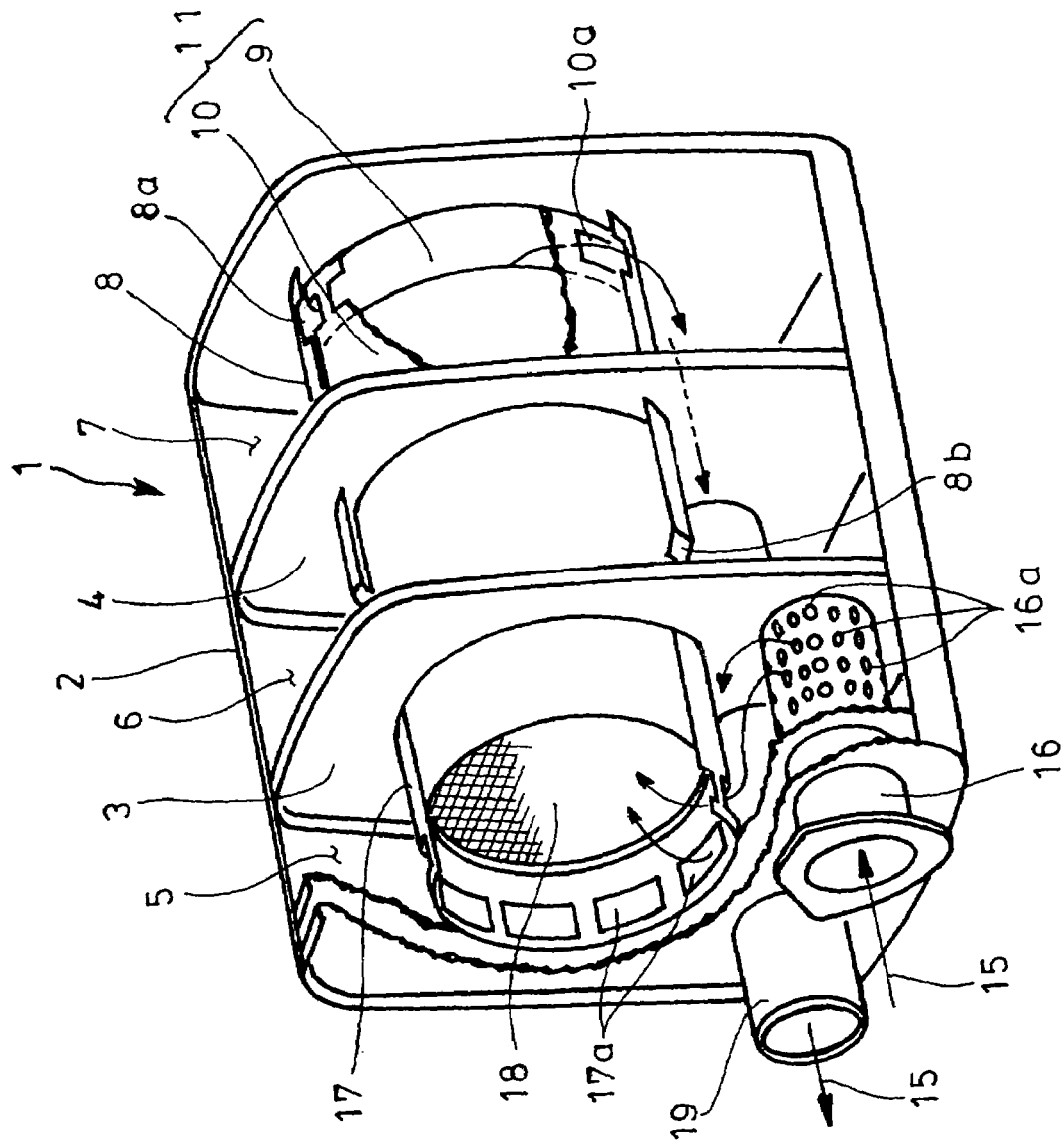
[FIG. 1] A partly cut-out perspective view of an embodiment of the invention.

EXPLANATION OF THE REFERENCE NUMERALS 1 muffler
8 inner shell
8$b$ tapered portion
8$c$ small-diameter portion
9 particulate filter
10 cartridge shell
11 filter cartridge
14 exhaust pipe
15 exhaust gas
20 sealing material
21 cushioning material
22 stopper ring (first stopper)
23 stopper ring (second stopper)
C insertion clearance

BEST MODE FOR CARRYING OUT THE INVENTION

An embodiment of the invention will be described in unction with the drawings.

FIGS. 1-4 show the embodiment of the invention in which a box-shaped muffler 1 has a casing 2 separated by separators 3 and 4 into first, second and third chambers 5, 6 and 7. A cylindrical inner shell 8 passing through the separator 4 is fixedly arranged to extend throughout the second and third chambers 6 and 7. This inner shell 8 defines a storage space for a particulate filter 9 within the casing 2 of the muffler 1.

The particulate filter 9 is integrally carried by a cylindrical cartridge shell 10 and unitized into a filter cartridge 11, the filter cartridge 11 being adapted to be fitted into the inner shell 8 by inserting the same at a rear surface of the casing 2 of the muffler 1.

Figure 2:
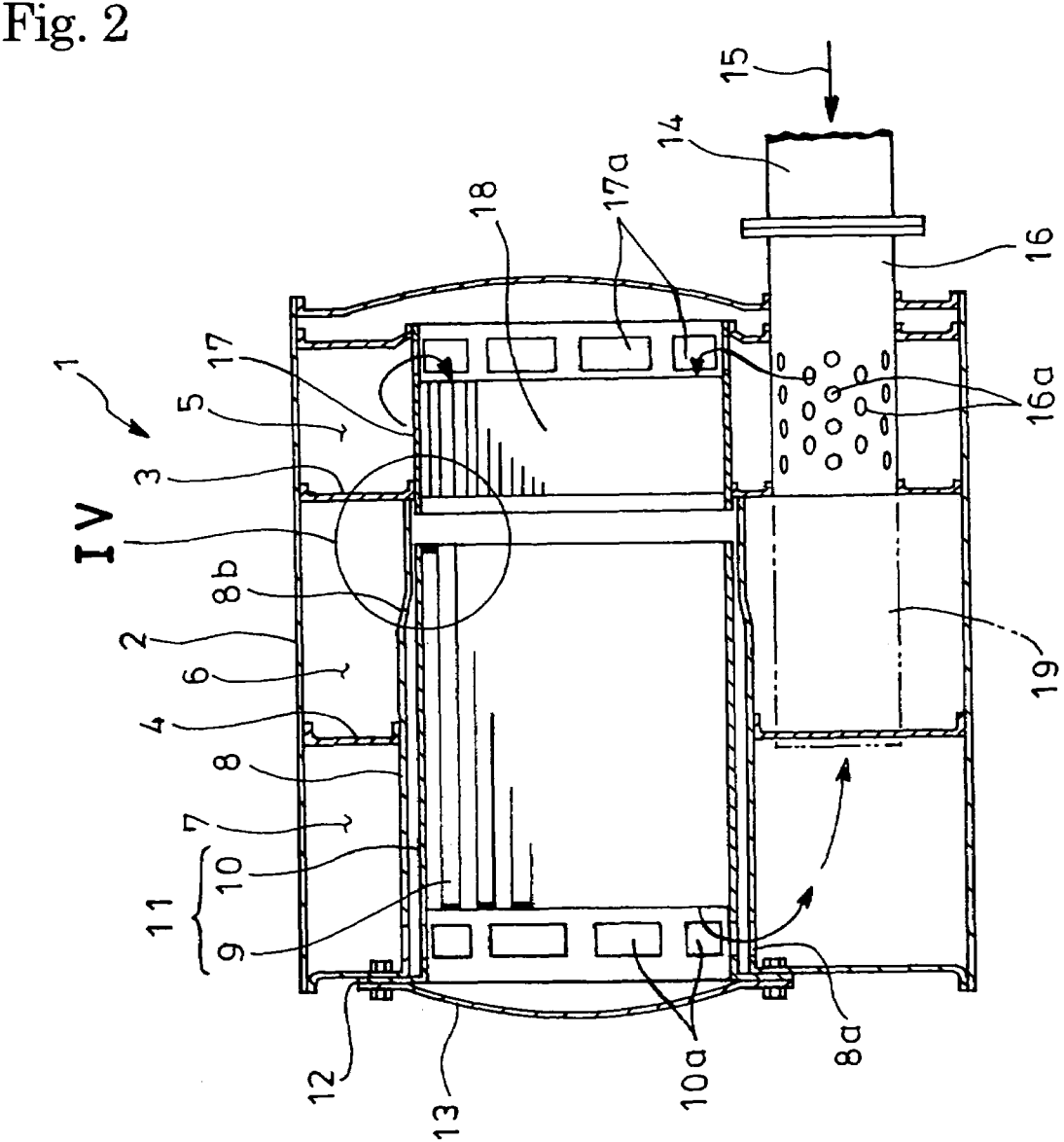
[FIG. 2] A vertical sectional view of the muffler shown in FIG. 1.
Figure 3:
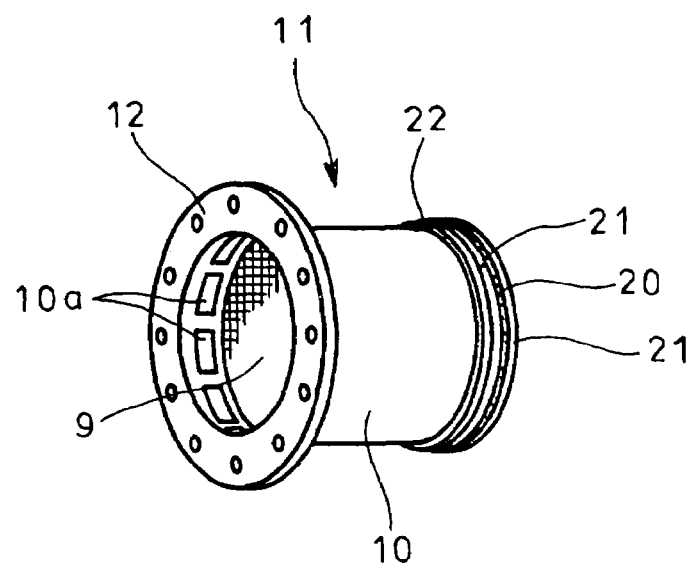
[FIG. 3] A perspective view of the filter cartridge shown in FIG. 2.

As shown in FIGS. 2 and 3, the cartridge shell 10, which carries the particulate filter 9, has a flange 12 on its end outward in a direction of insertion. After the cartridge shell 10 is inserted and stored in the inner shell 8, the flange 12 is bolt-fastened to the rear surface of the casing 2 of the muffler 1 together with an outer edge of a cover 13 which closes an opening of the cartridge shell 10 outward in the direction of insertion.

Moreover, an inlet pipe 16 for introduction of exhaust gas 15 from an upstream exhaust pipe 14 (see FIG. 2) is inserted via a front surface on the casing 2 of the muffler 1 up to the first separator 3 for closure of its tip such that the exhaust gas 15 introduced through the pipe 16 is discharged via diffused air holes 16$a$ to the first chamber 5.

In the first chamber 5, a catalyst shell 17 is fixedly arranged to pass through the separator 3 so as to communicate with the inner shell 8, a straight-flow type oxidation catalyst 18 being stored in the catalyst shell 17 so as to assist removal by combustion of the particulates captured on the particulate filter 9, the exhaust gas 15 in the first chamber 5 being introduced via slits 17$a$ of the catalyst shell 17 to an end of the oxidation catalyst 18 away from the particulate filter 9.

The exhaust gas 15 having passed through the oxidation catalyst 18 flows into the particulate filter 9 in the inner shell 8. After passing through the particulate filter 9 for capture of the particulates, the exhaust gas is discharged to the third chamber 7 via slits 10$a$ of the cartridge shell 10 adjacent to its end outward in the direction of insertion as well as corresponding slits 8$a$ on the inner shell 8.

An outlet pipe 19 for discharge of the exhaust gas 15 purified by the particulate filter 9 is inserted via the front surface on the casing 2 of the muffler 1 up to the third chamber 7 and in parallel with the inlet pipe 16 and with its tip being opened, so that the exhaust gas 15 discharged to the third chamber 7 is withdrawn via the outlet pipe 19 to a downstream exhaust pipe (not shown).

Figure 4:
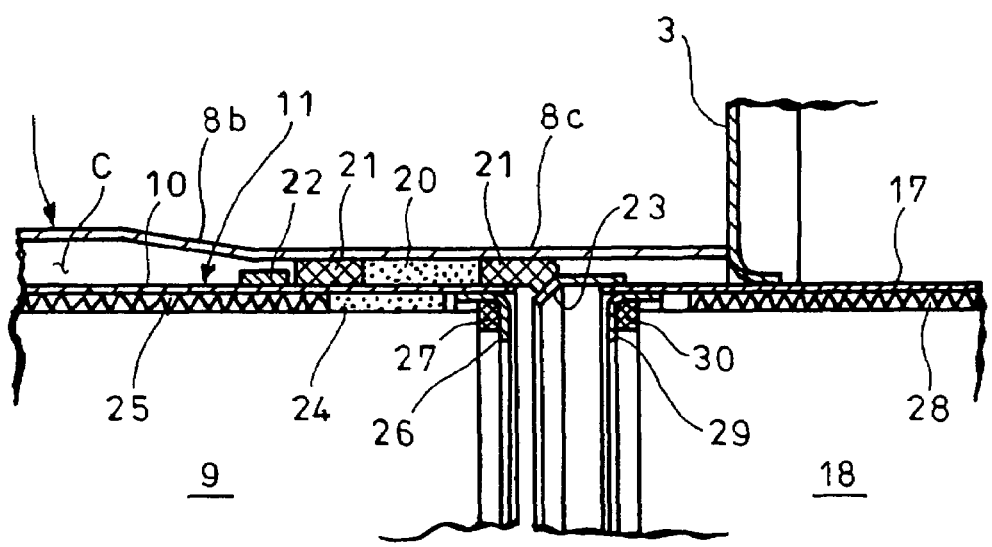
[FIG. 4] An enlarged view showing particulars of part IV in FIG. 2.

With respect to the thus constructed exhaust emission control device according to the embodiment, as shown in FIG. 4 in an enlarged manner, the inner shell 8 is formed to have an inner diameter substantially larger than the outer diameter of the cartridge shell 10 to provide an insertion clearance C; the inner shell 8 is formed with a tapered portion 8$b$ at a position short of an inward end thereof by a predetermined distance, said tapered portion 8$b$ being gradually reduced in diameter in the direction of insertion of the filter cartridge 11. A portion of the inner shell inward of said tapered portion is formed as a small-diameter portion with the reduced insertion clearance C.

Mat material made of heat-resistant fabric is fitted as sealing material 20 over an outer peripheral surface on an inward end of the cartridge shell 10 and net material made of metal wire is fitted as cushioning material 21 peripherally over the cartridge shell at positions outward and inward of the sealing material 20, the cushioning material 21 fitted inward being extruded inward out of the cartridge shell 10 by a predetermined distance.

Furthermore, a stopper ring 22 (first stopper) is provided on an outer peripheral surface of the cartridge shell 10 at a position short of the inward end thereof by a predetermined distance. A stopper ring 23 is provided on an end of the catalyst shell 17 in the inner shell 8 so as to hold together with the stopper ring 21 the sealing and cushioning materials 20 and 21 in a clamped manner upon fitting of the filter cartridge 11, the stopper ring 23 being in the form of tapered ring gradually reduced in diameter toward the cartridge shell 10 and having a maximum diameter slightly larger than the outer diameter of the cartridge shell 10.

In FIG. 4, reference numeral 24 denotes sealing material between the particulate filter 9 and the cartridge shell 10; 25, cushioning material between the particulate filter 9 and the cartridge shell 10; 26, an endplate which axially retains the particulate filter 9; 27, cushioning material between the endplate 26 and the particulate filter 9; 28, cushioning material between the oxidation catalyst 18 and the catalyst shell 17; 29, an endplate which axially retains the oxidation catalyst 18; and 30, cushioning material between the endplate 29 and the oxidation catalyst 18.

Thus, with the exhaust emission control device constructed as mentioned above, the insertion clearance C secured between the inner diameter of the inner shell 8 and the outer diameter of the cartridge shell 10 is utilized for easy insertion of the filter cartridge 11. Moreover, when the filter cartridge 11 is deeply inserted into the inner shell 8, the sealing and cushioning materials 20 and 21 on the inward end of the inner shell 8 are guided by the tapered portion 8b, whereby the filter cartridge 11 is centered and finally coaxially stored in the inner shell 8.

In this case, the sealing and cushioning materials 20 and 21 on the inward end of the cartridge shell 10 are smoothly compressed into the insertion clearance C reduced and defined by the inner diameter of the small-diameter portion 8c while receiving the wedge effect by the tapered portion 8b of the inner shell 8, whereby predetermined compression amounts are reliably obtained with respect to the sealing and cushioning materials 20 and 21. Moreover, concurrently, surface pressures on the sealing and cushioning materials 20 and 21 are peripherally equalized because of the filter cartridge 11 being centered.

Moreover, especially in the present embodiment, the sealing and cushioning materials 20 and 21 are also held in the clamped manner between the stopper rings 22 and 23, so that the cushioning material 21 extruded inward out of the cartridge shell 10 by a predetermined distance receives wedge effect between the same and the small-diameter portion 8c due to the tapered shape of the stopper ring 23 and is excellently pressed without buckling and kept in compression, whereby the sealing and cushioning materials 20 and 21 are further reliably compressed, resulting in further improvement in sealing performance by the sealing material 20 and cartridge-holding performance by the cushioning material 21.

Thus, according to the above embodiment, the insertion clearance C is secured between the inner diameter of the inner shell 8 and the outer diameter of the cartridge shell 10 for easy insertion of the filter cartridge 11, so that work or operation burden upon insertion of the filter cartridge 11 is remarkably relieved and thus, while improving the easiness in insertion of the filter cartridge 11, the sealing and cushioning materials 20 and 21 are reliably compressed to predetermined compression amounts. Moreover, the surface pressures on the sealing and cushioning materials 20 and 21 are peripherally equalized, so that the sealing performance by the sealing material 20 and the cartridge-holding performance by the cushioning material 21 are substantially improved in comparison with those obtained conventionally, thereby preventing the exhaust gas 15 from bypassing the particulate filter 9 and excellently holding the filter cartridge 11 without backlash.

INDUSTRIAL APPLICABILITY

It is to be understood that an exhaust emission control device according to the invention is not limited to the above-mentioned embodiment and that various changes and modifications may be made within the gist of the invention. For example, oxidation catalyst may not be necessarily arranged in series with and upstream of the filter cartridge. The muffler may not necessarily be box-shaped. Moreover, the first and second stoppers are not limited to the shape shown in the drawings.

The invention claimed is:

1. An exhaust emission control device comprising:
   an inner shell arranged fixedly in a muffler incorporated in an exhaust pipe;
   a particulate filter integrally carried by a cartridge shell and unitized into a filter cartridge which is fitted through insertion into said inner shell;
   wherein the inner shell is formed to have an inner diameter greater than an outer diameter of the cartridge shell to provide an insertion clearance, and said inner shell is formed with a tapered portion at a position short of an inward end thereof by a predetermined distance;
   wherein said tapered portion has a gradually reduced diameter in a direction of insertion of the filter cartridge, with a portion of the inner shell inward of said tapered portion being formed as a small-diameter portion with a reduced insertion clearance, and wherein said small-diameter portion is at a greater depth than said tapered portion with respect to said insertion direction; and
   sealing and cushioning materials fitted over an outer peripheral surface on the inward end of the cartridge shell and which are held in a clamped manner between the filter cartridge and the small-diameter portion of said inner shell upon fitting of the filter cartridge.

2. The exhaust emission control device as claimed in claim 1, wherein a first stopper is arranged on the outer peripheral surface of the cartridge shell at a position short of the inward end thereof by a predetermined distance, and a second stopper is provided in said inner shell such that the sealing and the cushioning materials are held in a clamped manner between the first and second stoppers upon fixing of the filter cartridge, wherein said second stopper is separate from said tapered portion, and wherein said second stopper is positioned inward of said tapered portion with respect to the insertion direction so as to be at a greater depth than said tapered portion.

3. The exhaust emission control device as claimed in claim 1, wherein a mat material made of heat-resistant fabric is fitted as the sealing material over the outer peripheral surface on the inward end of the cartridge shell, and a net material made of metal wire is fitted as the cushioning material peripherally on the cartridge shell at positions outward and inward of said sealing material, and wherein the cushioning material fitted inward is extruded inward out of the cartridge shell by a predetermined distance.

4. The exhaust emission control device as claimed in claim 2, wherein a mat material made of heat-resistant fabric is fitted as the sealing material over the outer peripheral surface on the inward end of the cartridge shell, and a net material made of metal wire is fitted as the cushioning material peripherally on the cartridge shell at positions outward and inward of said sealing material, and wherein the cushioning material fitted inward is extruded inward out of the cartridge shell by a predetermined distance.

5. The exhaust emission control device as claimed in claim 2, wherein the second stopper is in the form of a tapered ring gradually reduced in diameter toward the cartridge shell and has a maximum diameter slightly greater than the outer diameter of the cartridge shell.

6. The exhaust emission control device as claimed in claim 4, wherein the second stopper is in the form of a tapered ring gradually reduced in diameter toward the cartridge shell and has a maximum diameter slightly greater than the outer diameter of the cartridge shell.

7. The exhaust emission control device as claimed in claim 1, further including a stopper ring separate from said inner shell, wherein said stopper ring is radially inside of said small-diameter portion of said inner shell, and wherein said stopper ring is spaced inwardly from said tapered portion with respect to the insertion direction so as to be at a depth greater than said tapered portion.

* * * * *